United States Patent Office 2,763,569
Patented Sept. 18, 1956

2,763,569

SPRAYING PROCESS

Samuel W. Bradstreet, Oak Park, and James S. Griffith, Chicago, Ill., assignors to Armour Research Foundation of Illinois Institute of Technology, Chicago, Ill., a corporation of Illinois No Drawing. Application February 24, 1953,
Serial No. 338,585

8 Claims. (Cl. 117—47)

The present invention relates to a novel coating method and the product resulting therefrom, and more particularly, to a novel spray coating process for depositing a film of metal oxide upon the surface to be coated, and the product so obtained.

Although the instant invention has many possible uses, involving the coating of many different types of material, one of the most significant uses from an industrial point of view is that of applying a refractory metal oxide film or coating to metal parts which are to be subjected to high temperature operating conditions, for example, in the operation of a jet engine. It has been previously suggested to coat or otherwise protect various jet engine parts with other metals or refractory materials, but such coatings have not proven to be satisfactory in all cases. Such coating processes require that conditions be present which effect a firm bond between the coating and the base metal without unnecessarily deep penetration of the coating material into the base metal. Furthermore, the coating must have thermal-shock resistance, and a coefficient of thermal expansion substantially equal to that of the metal backing body. Also, the coating must be a refractory type of material that is non-volatile at the high operating temperatures contemplated.

One of the methods which has been suggested involves the use of ceramic materials. Such ceramic materials (which are essentially oxides of various metals) are ground to a very fine state and then applied, usually in the form of an aqueous slurry, to the surface of the article to be coated. The coating is then fired to fuse the individual particles. As will be appreciated, the firing of the coating must necessarily involve the use of temperatures in the region of the fusion points of the ceramic materials employed. If various metal oxides are incorporated in the ceramic materials for the purpose of reducing the fusion temperatures, and the firing temperature required thereby, the resulting ceramic coating is correspondingly less heat resistant and less effective. The principal difficulty with the use of such ceramic coatings is that the application of such coatings requires the subjection of the material to be coated to temperatures comparable to the fusion temperature of the ceramic materials. Also, the adherence of such coatings in many instances leaves something to be desired, in that the coatings themselves are in the nature of rigid (amorphous) glass-like integrated films which tend to adhere to the metal backing to the main extent by virtue of the integration of the entire film as contrasted to mutual adherence between the film and the body that is coated.

It is, therefore, an important object of the instant invention to provide an improved coating process, and an improved coated product obtained thereby.

It is a further object of the present invention to provide an improved low temperature spray coating operation which may be employed to coat materials with a flexible refractory metal oxide coating.

It is another object of the present invention to provide an improved coating process that is easily carried out using non-drastic operating conditions and that results in an unusually adherent flexible coating, which will adhere to a plurality of different materials.

Another object of the present invention is to provide an improved coating method which comprises atomizing a liquid phase containing a substantially unsolvated metal salt in sub-colloidal form in a volatile liquid vehicle, said salt being thermally unstable and releasing a refractory metal oxide upon thermal decomposition, directing the atomized liquid toward a surface to be coated and subjecting the atomized liquid to decomposition conditions to release the oxide and adhere the same to the surface.

A specific object of the instant invention is to provide an improved coating method which comprises exposing atomized ammonium zirconyl carbonate in aqueous solution to a surface that is heated to decompose the carbonate and deposit zirconia on the surface.

Other and further objects, features and advantages of the instant invention will become apparent to those skilled in the art from the following detailed disclosure of preferred embodiments thereof.

The instant invention consists in an improved coating method which comprises atomizing a solution of a substantially unsolvated metal salt that is thermally decomposible to release as an essentially non-volatile component an oxide of the metal, subjecting the atomized solution to thermal decomposition conditions and, immediately thereafter, impinging the released metal oxide against a surface to be coated to adhere the oxide thereto.

The instant invention has been found to be uniquely suitable for the application of a zirconia coating; and the superior results obtained in a preferred embodiment of the invention may be demonstrated as follows:

A saturated (12% zirconia) aqueous solution of ammonium zirconyl carbonate was diluted with twice its weight of water to obtain a 4% zirconia content solution which has been found to be the most preferred vehicle and concentration for zirconia deposition. A plurality of smooth mild steel plates (3" x 2" x 1/16"), free of scale, were polished with emery paper, degreased with hot carbon tetrachloride, and rinsed with acetone. Different plates were then mounted vertically in an electric furnace, and heated to different temperatures of 300°, 400°, 500°, 600° and 800° F.

Each of the plates thus heated was sprayed (using a paint spray gun) with the above-described solution so as to deposit a white zirconia coating thereon. The technique used for each temperature was believed to be that most favorable for the application of an adherent zirconia coating, and it involved operation of the spraying in accordance with observed results. If the spraying was too fast or too heavy, wet spots appeared on the plate and blisters and the like imperfections resulted at these locations. Also, the plates cooled too rapidly. If the spraying was too slow, the zirconia (decomposition product) particles appeared to form agglomerates which bounced off the plate as sand-like particles, instead of adhering. If, however, the rate of spraying is correlated with the plate temperature so as to fall between the two extremes, a uniform thin white zirconia coating adheres tenaciously to the plate.

Although it is not desired to limit this invention to any particular theory, the reaction which takes place, it is believed, may be represented by Equation 1 below:

(1) $(NH_4)_2 ZrO (CO_3)_2 \cdot x H_2O \rightarrow 2NH_3 + 2CO_2 + ZrO_2 + (x+1)H_2O$ wherein the $xH_2O$ represents a very weakly solvated, or substantially unsolvated, amount of the solvent in the system. As will be appreciated, all but the $ZrO_2$ (zirconia) product constitutes volatile matter which is readily vaporized at the temperatures here involved. Such vaporation may be facilitated by the use of reduced pressures, and the resulting operating temperature may be reduced also under such conditions.

It is believed that the decomposition of the ammonium zirconyl carbonate takes place immediately prior to (or at the very instant of contact) with the heated metal surface, so that molecular size zirconia particles are instantly released from what constituted a solution thereof. Such molecular size zirconia particles are thus impinged upon the metal surface and adhere thereto by virtue of physical phenomena such as intermolecular attraction, as contrasted to a true chemical bond and also as contrasted to the formation of a fused coherent layer of zirconia adhering to the surface by virtue of its own integration. Conceivably, only ZrO in essentially an ionic form is released and it acquires another oxygen atom approximately at the time it contacts the surface. In any event, the zirconia on the surface is in the form of extremely minute crystals perhaps of sizes comparable to the wave length of visible light (i. e., 2000–3000 A.).

Such a condition is known as "crypto-crystalline," in that the zirconia is truly crystalline with irregularities therein being of form (not valence, as in the case of amorphous materials). This crypto-crystalline zirconia film is flexible and coatings applied to sheet metal, as described above, adhere firmly without cracking, etc. when the sheet metal is folded over. This feature is particularly advantageous in that it permits the use of the coating operation before certain fabrication steps.

The initial coating applied by the use of a typical paint spray gun, as described, is about 1.5 mils in average thickness. More elaborate heating arrangements for maintaining the desired plate temperature would permit the application of a thicker film, of course; but the cooling effect of the aqueous solution on the process just described is quite appreciable. Accordingly, after a brief spraying period, the spraying is discontinued, the surface is rubbed down to remove loose matter and then reheated for a second spraying operation. By such repeated sprayings, thicknesses of as much as about 7 mils have been obtained.

One of the most unique features of the instant invention resides in the unusually low temperatures at which a zirconia coating may be applied to a given article. The fusion point of zirconia is in the neighborhood of 2700° C., and it will be readily appreciated that the firing of a pure zirconia slurry to fuse the individual particles as a coating on a given piece of metal would involve the use of extremely high temperatures, so as to render such a process wholly inoperative from an industrial point of view. In the instant process, however, it is possible to use extremely low temperatures, far below the fusion temperature of zirconia, in the application of a zirconia coating to an article. The industrial advantages of this process are, of course, apparent. A careful examination of the steel plates coated in accordance with the previously described process revealed that the zirconia coating applied at 300° F. appeared at first to be satisfactory, but upon aging under room conditions, some blistering and separation was noticeable, thereby indicating that 300° F. is approximately the minimum operating temperature for the particular ingredients here used (the defective portions of the coating here presumably resulting from cooling of the plate below the minimum of about 300° F.). Extremely good adherence of the coatings, as well as complete freedom from defects in the coatings, was obtained at the operating plate temperatures of 400° F. and 500° F. At the operating plate temperatures of 600° F. and 800° F., it was noticed that the coating had a tendency to be less adherent, and effective spraying was also found to be somewhat more difficult, presumably because of the greatly accelerated drying rate at such operating temperatures. The poor adherence of the coatings at the higher temperatures, particularly above 600° F., may be attributed essentially to the tendency of the steel to oxidize at such temperatures. An oxide film on the steel unquestionably would interfere with the best bonding conditions of the zirconia to the steel. It will be seen, accordingly, that the coating temperature should be about 300–600° F., and most preferably about 400–500° F. Actually, the particular operative and preferred temperature ranges for any given metal salt solution may be obtained experimentally, by a procedure comparable to the procedure just described, in accordance with the teachings of the instant specification.

As to the concentration of the solution, which is best expressed as a percent zirconia content, it has been found that a completely saturated solution (12% zirconia) may be used to obtain satisfactory results, although care must be taken in such an operation because the decomposition of the salt is quite vigorous. Also, solutions as dilute as about 0.1% zirconia may be used effectively, but concentrations more dilute than this are ordinarily not practical because of the excessively great cooling rate resulting from the rather large proportion of moisture. Preferably, concentrations of about 1–5% zirconia are used. (As used herein, the terms "parts" and "percent" mean parts and percent by weight, unless otherwise designated.) A 4% zirconia content, in an aqueous ammonium zirconyl carbonate solution, has been found to be the most preferred content for use in the instant process.

It will thus be seen that, in essence, the instant process involves first the spraying or atomizing of the aqueous ammonium zirconyl carbonate, in order to put the material in the most suitable condition for decomposition to release the zirconia, and then exposing the atomized aqueous ammonium zirconyl carbonate to the required decomposition conditions. As here shown, this is done by exposing the solution to a heated surface, sufficiently heated to effect decomposition of the carbonate, volatilization of all of the volatile decomposition products and the water of the aqueous solution, and release of minute zirconia particles which are deposited immediately upon the heated surface. Actually, such a heated surface must have a hot zone in the vapor phase immediately thereadjacent, and the solution is sprayed through this hot zone and against the heated surface. Needless to say, the heat for the hot zone is most conveniently obtained from the article to be coated, but not necessarily so. The important point is that the surface to be coated must be so positioned with respect to the atomized solution and the hot zone that the zirconia particles impinge upon (or are in contact with) the surface at almost the instant of their release through decomposition of the carbonate in the hot zone. It is a simple matter of experiment or observation for the operator of the spray gun to notice whether or not sand-like particles are bouncing off the surface to be coated. The presence of such sand-like particles, which under a microscope are quite obviously agglomerates of a great number of the minute zirconia particles released by decomposition, indicates clearly that the hot zone is improperly positioned with respect to the surface to be coated, to the extent that decomposition is taking place prematurely in this atomized solution passing through the hot zone. On the other hand, if the surface to be coated is obviously being "wetted" by the solution, then the hot zone is improperly positioned also in that it is ineffective for accomplishing the proper timing of the decomposition of the carbonate and the release of the zirconia particles. The operator will be able to readily discern whether or not wetting of the surface is taking place and also whether or not non-adherent zirconia agglomerates are impinging against the surface.

In connection with the surface to be coated, it has been found that a number of different types of surfaces and different types of materials may be suitably coated by the instant process. Most preferably, the surface to be coated is somewhat roughened, but this is not an absolute necessity. Various metal articles may be coated, and metal is preferred as a backing material for the instant process principally for the reason that refractory metal oxide coatings on metal parts are particularly useful industrially. However, the instant coating may be applied to a solid carbon body, for example, or any number of other ceramic or inorganic materials, such as mortar, fire brick, etc. The essential requirements are a clean surface, free from such materials as oil or the like. Also, the material must be sufficiently dry and otherwise heat stable to withstand the operating temperatures employed, although such heat stability may be improved, for example, by carrying out the instant process in a substantially inert or non-oxidizing atmosphere.

For example, chrome plated steel specimens were coated by carrying out the instant process at 400–500° F., and it was noted that no difference in results was obtained carrying out the process in air and also in a nitrogen atmosphere. It was noted, however, that the steel pieces and the chrome plated pieces received substantially better and more adherent coatings, if they were sandblasted prior to the application of the coating, so that their surfaces might be roughened slightly. A test, showing the refractory effectiveness of the instant coating was run using an oxygen-hydrogen torch to burn through the plates, the time required to burn through the plate being noted. It was found that uncoated steel plates and the uncoated chrome plated steel plate had burning times of 25 seconds in this test, whereas the roughened (sandblasted) chrome plated steel plate which had been coated (at 400° F.) with zirconia had a burning time of 32 seconds and the sandblasted mild steel plate which had been coated with zirconia at 400° F. had a burning time of 36 seconds.

Another particularly important property of the instant zirconia film or coating is its unique resistance to thermal shock. For example, the adherence of the instant zirconia coating is not impaired or altered if the heated steel plates coated with the zirconia film are quenched.

Still another important feature of the instant invention resides in the greatly improved adherence of a glass film which may be obtained by the application of a suitable glass coating over a zirconia coated article. This aspect of the invention is particularly useful with respect to, for example, molybdenum or molybdenum alloy articles which retain their strength at high temperatures but which tend to oxidize at high temperatures. The application of a suitable vitreous coating over the instant zirconia film effectively eliminates any possible permeability or porosity in the zirconia film and also results in a uniquely superior bonding of the vitreous coating upon the metal article (by virtue of the intermediate film or layer of zirconia). The glass coated article may thus be prepared by the use of any suitable vitrified ceramic mixture depending upon the particular properties desired in the glass coating. As is known, glass is essentially an amorphous fusion or solid solution of oxides of silicon, boron, phosphorus, with certain basic oxides such as those of calcium, magnesium, sodium, potassium, iron, cobalt, etc.

Comparable results may be obtained using an aqueous spraying solution of

$$(NH_4)_2XO(CO_3)_2$$

wherein X is a metal of group IV–A (i. e., Ti, Zr and Hf), and particularly Ti (as ammonium titanyl carbonate). Also the corresponding analogs of aluminum and magnesium may be used (as ammonium aluminum or magnesium carbonate). In each case, the conditions, concentrations, etc. will be found to be substantially the operative and preferred ranges hereinbefore set forth for zirconia coating procedures, but the characteristics of the resulting coating, of course, differ because of the characteristics of the metal oxides. The decomposition is essentially the same reaction with respect to the ammo-nium and carbonate portions of the molecule, and the operating conditions are thus the same.

Ammonium zirconyl carbonate and the other metal analogs above disclosed are preferred for several reasons. These compounds have suitable solubility, in water particularly; they decompose at low temperatures; and their decomposition products are comparably non-corrosive, non-toxic, etc. from an industrial point of view. Suitable solutions of other metal ammines or ammonia complexes are also useful. Such metal ammines have the characteristic of containing the metal therein in conjunction with ammonia groups, by coordinate linkage, which permit ready thermal decomposition. They are coordinated compounds.

As used herein, the term "coordinated compound" means a complexed association of ions which, though soluble, does not release free ions to the solution, particularly free (metallic) cations (which are retained in the compound by coordinate or Werner valences). The emphasis is thus on metal-ion coordination.

Many of the most commonly available water-soluble salts of refractory oxide forming metals are the ammines; and for this reason the metal ammines are preferred for use in the invention. Such compounds may be used in aqueous solutions, or in non-aqueous solutions such as organic bases, alcohols, etc., or in miscible mixtures thereof, the essence of the invention in this respect being the actual dissolving of the metal compound in the solvent medium. The compounds of this type undergo thermal decomposition to yield discrete metal-containing particles released from the atomized solution; and these metal-containing particles are preferably the oxides of the metal (although not necessarily so, as will be explained).

The solvent is, of course, volatile, or substantially more volatile than the metal oxide. Instead of the ammine, an organic base coordinated metal compound may be used, such as an ethylene diamine coordinated compound including the ethylene diamine chromium complexes.

Certain essential characteristics of the instant solution have been found to be necessary to the operation of the invention. The solution should contain a thermally unstable compound which releases a metal containing compound or particle that does not undergo further dissociation or decomposition in contact with the surface to be coated. Preferably the metal oxide per se is released. A solution of a coordinated metal compound, or one in which the metal ions are not retained entirely by the true valence bonds, is usually preferred. The salts of organic acids such as aluminum acetate have been found to be usually suitable. Also, such salts must be substantially unsolvated. As used herein, the term "unsolvated" refers to lack of solvation with respect to the metal portion, or cation of the salt (as well as the metal oxide decomposition product) at the operating temperatures and pressures under spraying conditions. By that is meant that the solvent does not form a secure bond with the salt or the metal oxide under the operating conditions so as to retain moisture, for example, water of hydration, in the metal oxide released. Subsequent decomposition to release such moisture from the metal oxide coating tends to disrupt the coating. The metal oxide released must be essentially non-volatile in all respects, including the tendency to decompose further into a volatile component such as moisture.

The metal compounds must be in solution or in essentially sub-colloidal (less than 0.5 micron size) form in the solvent or vehicle in order to obtain the beneficial results of the invention. This fine distribution of the metal compound is necessary in order to have the metal oxide (or metal-containing decomposition product) released therefrom in particle sizes small enough to adhere to the surface to be coated. The instant invention thus distinguishes completely in principle from the prior art concept of using a slurry of the ceramic material in finely subdivided form and subsequently fusing the material.

In the instant invention, it is believed that the metal compound must decompose simultaneously with the evaporation of the solvent or immediately thereafter, substantially prior to appreciable gathering together of the molecules as in the phenomenon of crystal formation or precipitation in a supersaturated solution.

Because of the importance of alumina coatings industrially, certain aluminum compounds have been found to be unusually effective. For example, an aluminum nitrate (4% alumina content) in anhydrous ethanol has been found to give superior results in a procedure substantially the same as that described, only using 400° up to 1200° F. as operating temperatures. This is particularly advantageous in that it avoids the use of water as a solvent, which may be undesirable in special instances. Alumina contents of about 0.1–10 or 12% may be used successfully, but about 1–5% is preferred.

If aqueous aluminum nitrate solutions are used, the preferred temperatures are about 600–1200° F. In general, temperatures for all aluminum salts (including ammonium aluminum carbonate) should be a little higher than those used for a corresponding zirconia solution because alumina has a greater tendency toward solvation (i. e. hydration) and operating temperatures should be used which clearly effect "unsolvation" of alumina. Soluble aluminum acetate may be used under substantially the conditions described for aluminum nitrate with comparable results.

It has been found that certain salts or compounds are uniquely suitable for accomplishing this purpose at low temperatures, far below the fusion temperatures of the oxides or other metal containing coatings which are obtained. These compounds include the soluble (water or organic solvent) carbonates, nitrates and acetates (which include the organic analogues). The ammoniated forms of these compounds are often preferable because of their superior solubility. Most preferably, however, the nitrates are used in the case of the greater number of metals.

The nitrates which may be used include those of the metals of groups II–A (Mg, Ca, Ba, and Sr); II–B (Zn and Cd); III–A (Sc, Y, and La); III–B (Al, Ga, In, and Tl); IV–A (Ti, Zr and Hf); IV–B (Pb and Sn); VI–A (Cr, Mo and W); VII–A (Mn); and the rare earth metals (Ce, Pr, Nd, Sm, Eu, Gd, Dy, Ho, Er, Tm, Yb and Th).

The ammonium carbonate salts which may be used include those of Mg, Ca, Ba, Sr, Al, Ti, Zr, Hf, and Ce.

In general, it will be seen that the anion employed must be thermally unstable at operating conditions. Primarily, the metal compound is thermally unstable at in spraying operating conditions. Also, the metal cation or metal portion of the compound, before and after decomposition, must be substantially unsolvated, i. e., the solvated form either does not exist or is thermally unstable at the operating temperatures. Also, the anion is an unstable anion such as the carbonate or nitrate (which are most preferred), or in some cases, the nitrites, phosphates, phosphites, etc. The ionic bond between the cation and anion is, of course, unstable so as to permit decomposition. The net result is thus believed to be the subjection of the atomized solution to conditions drastic enough to substantially simultaneously evaporate the vehicle or solvent and decompose the compound so as to release the desired metal-containing particles and to cause these particles in their pre-agglomerated "molecular" condition to be in contact with the surface to be coated so that each individual particle practically fits into the molecular lattice work at the surface and is presumably retained thereon by intermolecular forces.

Particularly suitable formulations are as follows:

Group II

A 4% calcium oxide content aqueous calcium nitrate solution deposits a calcium oxide coating at spraying temperatures of 400°–1200° F.; although most adherent coatings are obtained at 1000–1200° F.

Comparable results may be obtained using magnesium, barium or strontium nitrates, or the ammonium carbonates of any of these metals in aqueous (or aqueous alcohol) solutions. The higher operating temperatures here are indicated because of the tendency of these oxides to remain solvated at lower temperatures. Even these refractory oxides (i. e. fusing at at least about 2000° F.), may be subsequently fired so as to cause additional or different adhesion through glass-like coating formation, or a ceramic slurry may be applied (to this or any of the films of the invention) and then fired to form a glass coating. The corresponding zinc and cadmium salts may also be used (particularly, zinc nitrate).

Group III–A

A 4% yttrium oxide content aqueous yttrium nitrate solution deposits a yttrium oxide coating at spraying temperatures of 400°–1200° F., and preferably about 600° F.

Comparable results will be obtained using the corresponding scandium or lanthanum salts.

Group III–B

The results using aluminum nitrate, acetate or ammonium carbonate have already been mentioned; and the soluble gallium, indium and thallium nitrates give similar results.

Group IV

As has been explained ammonium zirconyl carbonate is particularly well suited for use in the invention. So also are the titanium and hafnium (which is present in the zirconium salt) analogues under the same conditions. These compounds give bright white coatings advantageous for decorative (as well as refractory purposes). Zirconium, titanium, lead, tin and hafnium nitrates are also suitable. The titanium nitrate must be employed in acid solution maintained under about ½ atmosphere pressure, prior to spraying, but it is readily decomposed in the atomized state thereby permitting the use of spraying temperatures even below the 300° F. minimum for ammonium zirconyl carbonate.

Rare earth metals

Typical of the rare earth metals is cerium which produces a highly superior product. For example, spraying with 1%, 2% and 4% ceria content aqueous cerium nitrate solutions resulted in the deposition of extremely adherent white coatings. Other rare earth metal oxides coating may be similarly formed.

Miscellaneous metals and mixtures

Manganese nitrate and the nitrates of chromium, molybdenum and tungsten may be used similarly; and among the metals of group VI–A chromium has been found to be most unusual. A 4% chromia content aqueous chromium nitrate solution was found to spray (at 400–600° F.) on an unusually adherent coating of chromia which was dark greenish-black instead of the bright green color normally found in chromia. The color could not be readily explained, but the surface contained an unusual crypto-crystalline chromia pattern clearly indicating a form of chromia not heretofore known.

Also, a mixture of (4% ceria) aqueous cerium nitrate and (4% chromia) aqueous chromium nitrate was found to give a coating of superior adherence at spraying temperatures of 400–600° F. It was found that closer control than normal was necessary, however, to avoid "wetting" or "agglomeration," presumably because the decomposition rates of the two compounds are not exactly the same.

In order to further ascertain the nature of the phenomena here involved, spraying of a commercial silicic acid solution was attempted (using a slightly alkaline solution of a slight amount of sodium silicate in a high silica sol, e. g. $Na_2O.9SiO_2$, having about 4% $SiO_2$ content). It was found that a fine silica coating that adhered well was obtained at 1200° F. Presumably, lower temperatures may be used under conditions more favorable to dehydration of the silica during spraying. The sub-colloidal silica sol particles here apparently were released from solution substantially free from moisture.

Although the instant invention is principally concerned with the spray-deposition of metal oxides and the decomposition deposit has been referred to mainly as a metal oxide, the same principles apply to certain other refractory type metal-containing materials, which may be deposited by decomposition of a soluble compound in solution. For example, calcium hexametaphosphate (a soluble coordinated compound) may be deposited from a 4% calcium oxide content solution in the instant spraying process, at 600–1200° F. to obtain a calcium containing coating that is principally a calcium phosphate containing some calcium oxide. Comparable results may be obtained using the iron and manganese analogues.

In all cases, metal oxide contents of about 0.1–10% may be used (if the compounds are sufficiently soluble) and preferably about 1–5% is used. It has been found that in the case of such preferred compounds as the Zr, Al, Cr and Ce compounds about 4% metal oxide content in the solution is most effective.

It will be understood that modifications and variations may be effected without departing from the scope of the novel concepts of the present invention.

We claim as our invention:

1. A coating method which comprises providing a solution in water of an oxygen containing substantially unsolvated metal salt that is thermally decomposible at 400–600° F. to yield directly a refractory metal oxide, the metal oxide content of said solution being 0.1–10%, atomizing the solution, and directing the atomized solution against a surface having a temperature of 400–600° F. which is hot enough to thermally decompose the compound to release the refractory metal oxide particles in discrete form to contact and adhere to the surface and to volatilize the remaining volatile components within the time period from just prior to contact between the particles and the surface to substantially the instant of contact between the particles and the surface, whereby the particles of refractory metal oxide retain the solid form after decomposition of the metal compound and while retained on the surface so as to provide a coating on said surface.

2. A method as claimed in claim 1 wherein the metal salt is $(NH_4)_2XO(CO_3)_2$ wherein X is a metal of group IV-A.

3. A coating method which comprises atomizing 1–12% zirconia content aqueous ammonium zirconyl carbonate solution and directing the atomized solution against a surface maintained at 300–600° F. at a rate sufficient to impinge adherent zirconia particles against the surface and to effect substantially complete vaporization of the volatile components of the solution within the time period from just prior to contact with the surface to substantially the instant of contact between the particles and the surface.

4. A method as claimed in claim 1 wherein the metal is titanium.

5. A method as claimed in claim 1, wherein the metal is chromium.

6. A method as claimed in claim 1, wherein the metal is aluminum.

7. A method as claimed in claim 1, wherein the metal is cerium.

8. A coating method which comprises providing a solution in water of a metal nitrate that is thermally decomposible at 400–1200° F. to yield directly a refractory metal oxide, the metal oxide content of said solution being 0.1–10%, atomizing the solution, and directing the atomized solution against the surface having a temperature of 400–1200° F. which is hot enough to thermally decompose the compound to release the refractory metal oxide particles in discrete form to contact and adhere to the surface and to volatilize the remaining volatile components within the time period from just prior to contact between the particles and the surface to substantially the instant of contact between the particles and the surface, whereby the particles of refractory metal oxide retain the solid form after decomposition of the metal compound and while retained on the surface so as to provide a coating on said surface.

References Cited in the file of this patent

UNITED STATES PATENTS

| | | |
|---|---|---|
| 991,273 | Christensen | May 2, 1911 |
| 2,179,453 | Palmateer | Nov. 7, 1939 |
| 2,457,853 | Van Mater | Jan. 4, 1949 |
| 2,557,983 | Linder | June 26, 1951 |
| 2,648,753 | Lytle | Aug. 11, 1953 |

OTHER REFERENCES

Chemical Abstracts, vol. 42, page 8697.